(12) United States Patent
Prabhu

(10) Patent No.: US 6,463,525 B1
(45) Date of Patent: Oct. 8, 2002

(54) MERGING SINGLE PRECISION FLOATING POINT OPERANDS

(75) Inventor: J. Arjun Prabhu, Palo Alto, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/375,700

(22) Filed: Aug. 16, 1999

(51) Int. Cl.[7] .................................................. G06F 9/38
(52) U.S. Cl. ........................ 712/222; 712/23; 708/513
(58) Field of Search ............................ 712/222, 210, 712/23; 711/171; 708/495, 515, 518

(56) References Cited

U.S. PATENT DOCUMENTS

| 5,515,520 A | * | 5/1996 | Hatta et al. ................. 708/550 |
| 5,752,271 A | * | 5/1998 | Yung ........................... 711/171 |
| 5,778,247 A | * | 7/1998 | Tremblay ..................... 712/213 |

* cited by examiner

Primary Examiner—Eric Coleman
(74) Attorney, Agent, or Firm—William L Paradice, III

(57) ABSTRACT

Where it is desired to perform a double precision operation using single precision operands, first and second single precision operands are loaded into first and second respective rows of a re-order buffer, and third and fourth single precision operands are loaded into third and fourth respective rows of the re-order buffer. A first merge instruction copies the first and second single precision operands from respective first and second rows of the re-order buffer into first and second portions of a fifth row of the re-order buffer, thereby concatenating the first and second single precision operands to represent a first double precision operand. A second merge instruction copies the third and fourth single precision operands from respective third and fourth rows of the re-order buffer into first and second portions of a sixth row of the re-order buffer, thereby concatenating the third and fourth single precision operands to represent a second double precision operand. The first and second double precision operands stored in the fifth and sixth rows, respectively, of the re-order buffer are then provided directly to an associated FPU for execution.

16 Claims, 3 Drawing Sheets

$$
\begin{array}{r}
\text{d0} \quad \boxed{\text{f0} \quad \text{f1}} \\
+ \ \text{d2} \quad \boxed{\text{f2} \quad \text{f3}} \\
\hline
\text{d4} \quad \boxed{\text{f4} \quad \text{f5}}
\end{array}
$$
FIG. 2
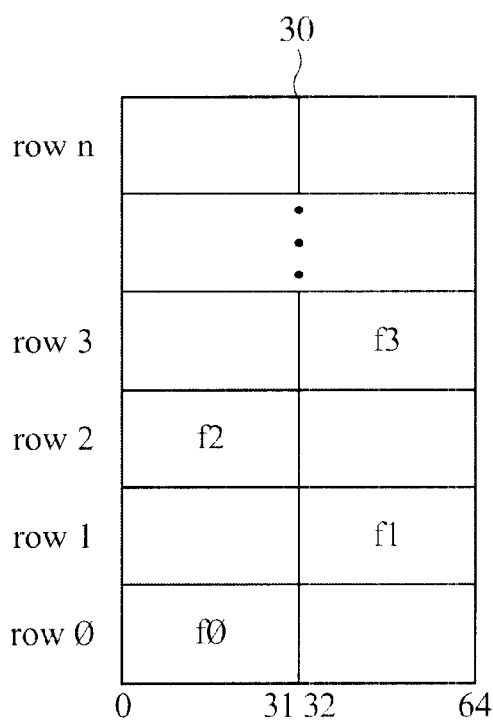
FIG. 3A
(PRIOR ART)
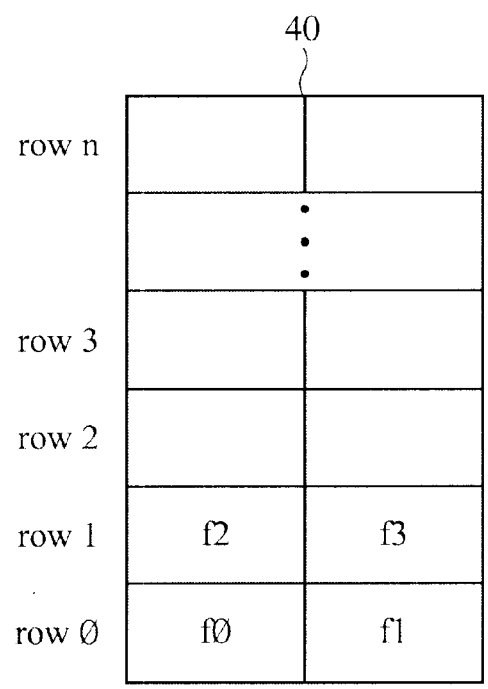
FIG. 3B
(PRIOR ART)

MERGING SINGLE PRECISION FLOATING POINT OPERANDS

BACKGROUND

1. Field of Invention

This invention relates generally to systems for processing information and specifically to the implementation of double precision operations using single precision operands.

2. Description of Related Art

A floating point execution unit (FPU) performs arithmetic operations such as addition and subtraction on numerical operands represented in floating point notation. Floating point notation uses a sign, a mantissa, and an exponent to represent integer and fractional numerical values. IEEE standard 754-1985 sets forth acceptable formats for representing decimal numbers in floating point notation in order to ensure uniformity and compatibility between various computer architectures. The IEEE floating point notation formats include single word and double word formats, as well as extended word and other formats. A single word includes 32 bits, typically with 1 bit representing the sign, 8 bits representing the magnitude of the exponent, and 23 bits representing the numeric value of the mantissa, while a double word includes 64 bits, typically with 1 bit representing the sign, 11 bits representing the magnitude of the exponent, and 52 bits representing the numeric value of the mantissa.

Instructions that produce 32-bit results from two 32-bit operands are typically referred to as single precision operations, and instructions which produce 64-bit results from two 64-bit operands are typically referred to as double precision operations. When performing double precision operations, the 64-bit operands may be represented by concatenations of two 32-bit operands aliased from respective 32-bit load operations, rather than from 64-bit load operations. Such aliasing allows architectures having 32-bit loads to implement double precision operations.

FIG. 1 is a block diagram of a 32-bit pipelined processor architecture having a memory 10, routing logic 20, a re-order buffer 30, a register file 40, a multiplexer (mux) 50, and a floating point execution unit (FPU) 60. Memory 10, which may be a memory cache (e.g., L1 and L2 cache), computer main memory (e.g., DRAM), some suitable external memory (e.g., disk drive), or an appropriate combination of the above, loads 32-bit single precision operands to re-order buffer 30 and/or register file 40 via routing logic 20. Re-order buffer 30 is a 64-bit wide memory element that typically stores one result per row, i.e., either a 32-bit result or a 64-bit result per row, and is used in a well-known manner to facilitate out-of-order instruction execution. Register file 40 is a 64-bit wide architectural file that stores either two 32-bit operands or one 64-bit operand per row. Register file 40 stores operands upon retirement of corresponding instructions, and is continually updated to maintain current architectural operand values. Mux 50 selectively couples re-order buffer 30, register file 40, and/or the result of FPU 60 as input to FPU 60. FPU 60 is well known and performs arithmetic operations such as addition and subtraction using floating point operands selectively loaded from re-order buffer 30, register file 40, or the result of FPU 60. Typically, each load operation provides data stored in one row of re-order buffer 30 or register file 40 (or the result of FPU 60) to FPU 60 as an operand.

As mentioned above, 64-bit operands may be represented in the pipeline architecture of FIG. 1 by concatenating two 32-bit operands. FIG. 2 illustrates a 2-way single instruction-multiple data (SIMD) single precision instruction which implements a double precision addition operation by executing two single precision operations in parallel. The two single precision operations f0+f2=f4 and f1+f3=f5 simultaneously execute to implement the double precision instruction fadd %d0, %d2, %d4, where the 64-bit operand d0 is aliased to 32-bit operands f0 and f1, the 64-bit operand d2 is aliased to 32-bit operands f2 and f3, and the 64-bit result d4 is aliased to 32-bit results f4 and f5.

To implement the double precision operation depicted in FIG. 2 using the architecture of FIG. 1, the 32-bit operands f0–f3 are first loaded from memory 10 into corresponding rows of re-order buffer 30 via routing logic 20. The load operations load the operands f0–f3 into unique rows of re-order buffer 30. Thus, as shown in FIG. 3A, the 32-bit operand f0 may be loaded into row 0 of re-order buffer 30 in a first clock cycle, the 32-bit operand f1 may be loaded into row 1 of re-order buffer 30 in a second clock cycle, the 32-bit operand f2 may be loaded into row 2 of re-order buffer 30 in a third clock cycle, and the 32-bit operand f3 may be loaded into row 3 of re-order buffer 30 in a fourth clock cycle.

As mentioned above, FPU 60 receives its two operands by selectively loading two rows of re-order buffer 30 or register file 40 (or the result of FPU 60) using two corresponding load operations. However, the two 64-bit operands required for the double precision instruction are each aliased to two 32-bit operands, which in turn are stored in four separate rows of re-order buffer 30. Since the four 32-bit operands f0–f3 are stored in separate rows of re-order buffer 30, as depicted in FIG. 3A, and since only two rows of re-order buffer are typically loaded into FPU 60 per instruction, only two of the four 32-bit operands f0–f3 are immediately available from re-order buffer 30.

Typically, in order to make all four 32-bit operands f0–f3 available to the FPU 60 in two load operations, 32-bit operand pair f0–f1 and pair f2–f3 are written to respective first and second rows of register file 40 upon retirement of the operands. For example, referring to FIG. 3B, when retired, operands f0 and f1 are written to the first 32 bits and second 32 bits, respectively, of row 0 of register file 40, and are thereby concatenated to represent 64-bit operand d0. Similarly, when retired, operands f2 and f3 are written to the first 32 bits and second 32 bits, respectively, of row 1 of register file 40, and are thereby concatenated to represent 64-bit operand d2. Now, the four 32-bit operands f0–f3 aliased to the double precision instruction may be loaded into FPU 60 using two load operations, i.e., by retrieving rows 0 and 1 from register file 40.

Although concatenation of 32-bit operands within register file 40 advantageously allows for implementation of double precision operations, the concatenated operands d0 and d2 are not available until after all four of the 32-bit operands f0–f3 are retired from re-order buffer 30 to register file 40. The typical latency delay associated with retirement of the four operands f0–f3 is 4 or more clock cycles. Thus, implementation of double precision operations using operands bypassed from single precision operations, as described above, may require 7 or more clock cycles to complete, as summarized below in Table 1.

TABLE 1

| command | clock cycle |
| --- | --- |
| load % f0 | 0 |
| load % f1 | 1 |
| load % f2 | 2 |

TABLE 1-continued

| command | clock cycle |
|---|---|
| load % f3 | 3 |
| fadd % d0, % d2, % d4 | 7 |

It would be therefore desirable to implement double precision operations where the operands are bypassed from instructions which produce single precision operands without having to wait for the retirement of older instructions.

SUMMARY

A method is disclosed which allows for implementation of double precision operations having operands bypassed from single precision instructions without having to wait for write-back of the operands to an architectural register file. In one embodiment of the present invention, where pairs of single precision operands are aliased to represent double precision operands, first and second single precision operands are loaded into first and second respective rows of a re-order buffer, and third and fourth single precision operands are loaded into third and fourth respective rows of the re-order buffer. A first merge instruction copies the first and second single precision operands from respective first and second rows of the re-order buffer into first and second portions of a fifth row of the re-order buffer, thereby concatenating the first and second single precision operands to represent a first double precision operand. A second merge instruction copies the third and fourth single precision operands from respective third and fourth rows of the re-order buffer into first and second portions of a sixth row of the re-order buffer, thereby concatenating the third and fourth single precision operands to represent a second double precision operand. The first and second double precision operands stored in the fifth and sixth rows, respectively, of the re-order buffer may then be provided directly to an associated FPU using only two load operations. In this manner, the double precision operands are available from the re-order buffer and, therefore, execution within the FPU need not wait for retirement of the four aliased single precision operands.

BRIEF DESCRIPTION OF THE DRAWINGS

FIG. 2 illustrates a double precision floating point addition operation implemented using four aliased single precision operands;

FIGS. 3A and 3B are block diagrams of a re-order buffer and an architectural register file, respectively, illustrating implementation of the double precision operation of FIG. 2 according to prior art techniques.

Like reference numerals refer to corresponding parts throughout the drawing figures.

DETAILED DESCRIPTION

Figure 1:
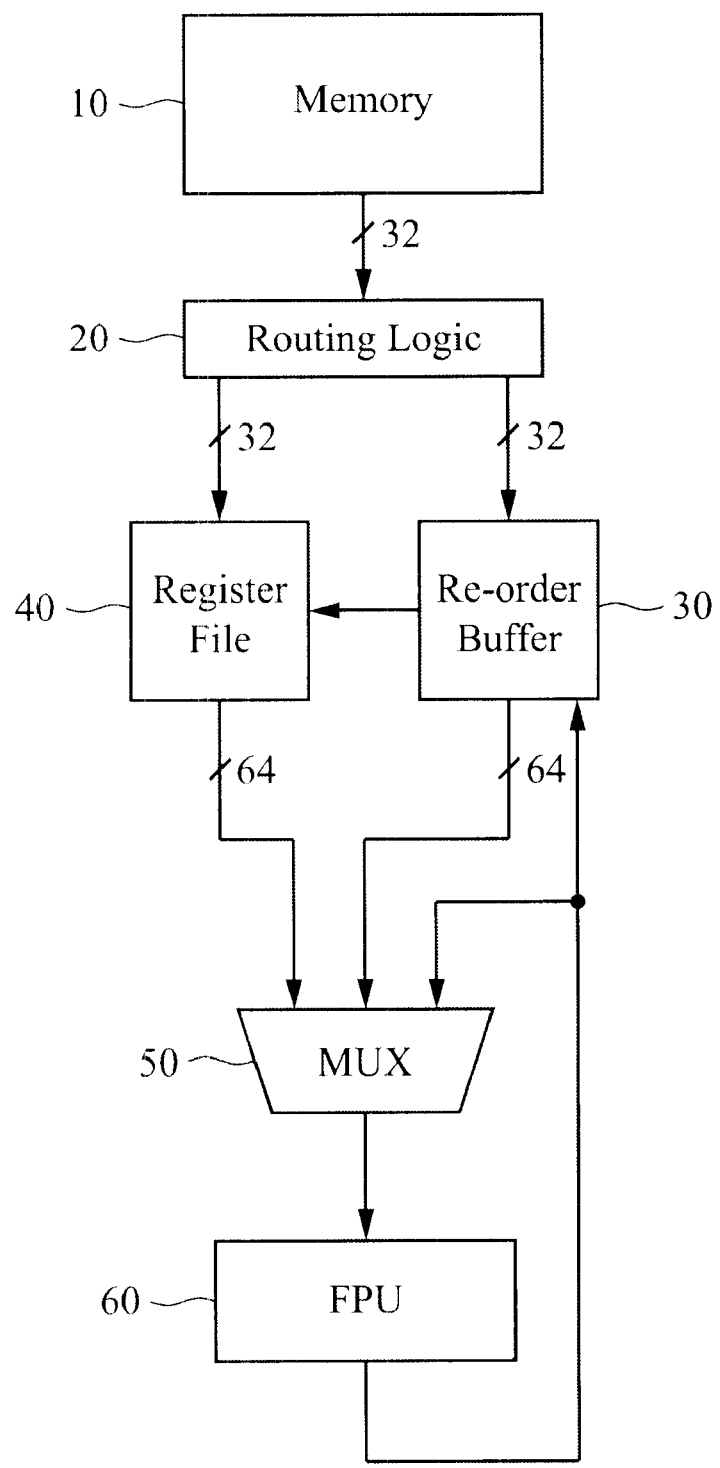
FIG. 1 is a block diagram of a CPU pipeline architecture.

The present invention is described below with reference to the pipeline architecture of FIG. 1 and the floating point operation of FIG. 2 for simplicity only. It is to be understood that embodiments of the present invention are equally applicable to other suitable pipeline architectures, and may be used to implement other than double precision operations. Accordingly, the present invention is not to be construed as limited to specific examples described herein but rather includes within its scope all embodiments defined by the appended claims.

In accordance with the present invention, when performing double precision operations using single precision operands to represent double precision operands, a merge command is used to concatenate corresponding pairs of single precision operands within the re-order buffer such that the represented double precision operands are immediately available to the FPU from the re-order buffer. Here, where the first double precision operand is represented by first and second single precision operands, and the second double precision operand is represented by third and fourth single precision operands, the four single precision operands are loaded into four corresponding rows of the re-order buffer in any suitable well-known manner. A first merge instruction copies the first and second single precision operands from corresponding rows of the re-order buffer into a first selected row of the re-order buffer. A second instruction copies the third and fourth single precision operands from corresponding rows of the re-order buffer into a second selected row of the re-order buffer. The two resultant first and second selected rows of the re-order buffer are then provided directly to the FPU for execution as first and second double precision operands. Thus, unlike prior art techniques, present embodiments allow double precision operands formed by concatenated pairs of single precision operands to be loaded directly to the FPU without retirement of the aliased single precision operands to the architectural register file.

Figure 4A:
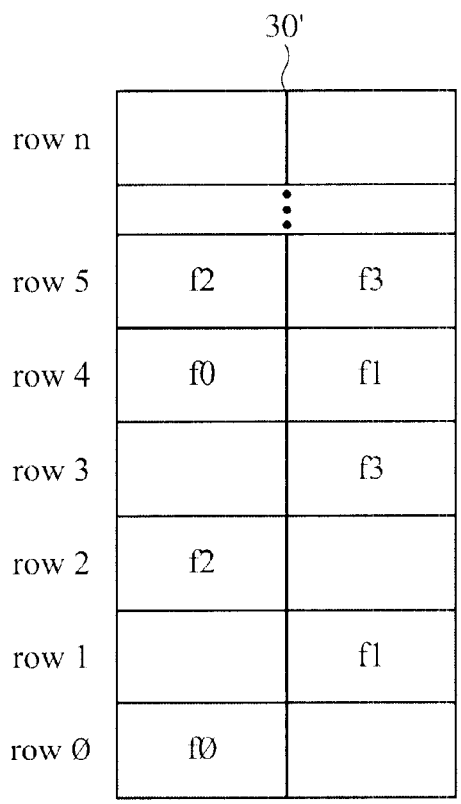
FIGS. 4A and 4B are block diagrams of a re-order buffer and an architectural register file, respectively, illustrating implementation of the double precision operation of FIG. 2 in accordance with the present invention.

Present embodiments are perhaps better understood when described in light of an example. Taking the double precision floating point operation fadd %d0, %d2, %d4 depicted in FIG. 2, 64-bit operand d0 is aliased with 32-bit operands f0 and f1, 64-bit operand d2 is aliased with 32-bit operands f2 and f3, and 64-bit result d4 is aliased with 32-bit values f4 and f5. Thus, 32-bit operands f0 and f2 are added to produce 32-bit result f4, and 32-bit operands f1 and f3 are added to produce 32-bit result f5. The four operands f0, f1, f2, and f3 are loaded from memory 10 into respective rows 0, 1, 2, and 3 of re-order buffer 30 via routing logic 20 in a well-known manner, as illustrated in FIG. 4A. In some embodiments, the four operands f0–f3 are loaded into respective rows 0–3 of re-order buffer 30 using successive single precision load operations, 20 e.g., where load %f0 is completed in a first clock cycle, load %f1 is completed in a second clock cycle, load %f2 is completed in a third clock cycle, and load %f3 is completed in a fourth clock cycle. In other embodiments, the four single precision operands f0–f3 are loaded into respective rows of re-order buffer 30' using a single load command, i.e., where load %f0, %f1, %f2, %f3 is completed in one clock cycle. In any case, each 32-bit operand is loaded into a corresponding row of re-order buffer 30 using a well-known load operation.

A first merge command retrieves the 32-bit operands f0 and f1 from rows 0 and 1, respectively, of re-order buffer 30' and merges them into 64-bit operand d0 by loading the first 32-bit operand f0 into the first 32-bits of row 4 of re-order buffer 30 and loading the second 32-bit operand f1 into the second 32-bits of row 4 of re-order buffer 30, thereby concatenating operands f0 and f1 to represent 64-bit operand d0. In a similar manner, a second merge command is used to concatenate 32-bit operands f2 and f3 into row 5 of re-order buffer 30 and to represent 64-bit operand d2. In one embodiment, each merge command requires one clock cycle to complete.

Figure 4B:
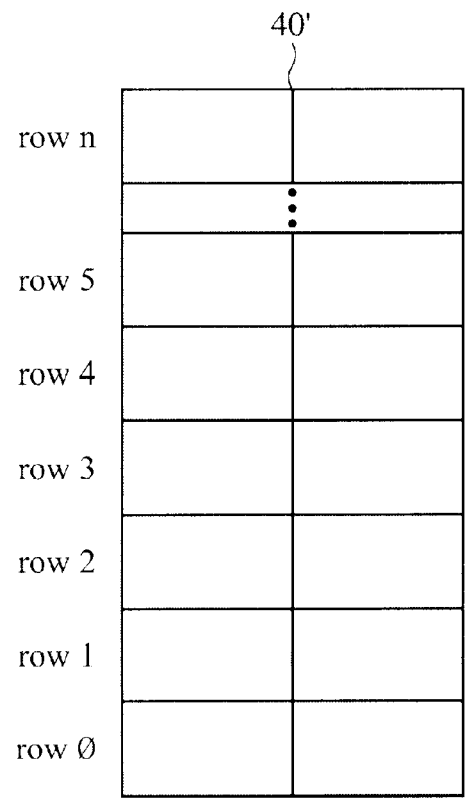

Since 64-bit operands d0 and d2 are now loaded within rows 4 and 5, respectively, of re-order buffer 30, both may be provided directly from re-order buffer 30 to FPU 60 using two load operations by selecting rows 4 and 5 of re-order buffer 30 as source addresses for 64-bit operands d0 and d2. In this manner, write-back of 32-bit operands f0–f3 to register file 40 is not required to for loading into FPU 60 in two load operations, as illustrated by the empty register file 40 of FIG. 4B. Appropriate control signals are provided to re-order buffer 30 and mux 50 such that rows 4 and 5 of re-order buffer 30 are provided to FPU 60, which then executes the double precision operation using the aliased 32-bit operands f0–f3. The 64-bit result, which as mentioned above is aliased with 32-bit values f4 and f5, is thereafter retired to register file 40 in a well-known manner.

In contrast, prior art techniques which concatenate pairs of 32-bit operands during write-back to register file 40 to form 64-bit operands must wait until older instructions are retired to register file 40 before providing the aliased operands to FPU 60. Accordingly, by concatenating pairs of single precision operands to corresponding rows within re-order buffer 30, present embodiments allow the resultant double precision operands to be loaded directly from re-order buffer 30 to FPU 60, thereby rendering latency delays associated with retirement of the 32-bit operands as non-critical to performance. In this manner, present embodiment may improve processing speeds when using aliased single precision operands to implement double precision operations. For example, by not having to wait for retirement of the 32-bit operands to register file 40, the above-described floating point addition operation fadd %d0, %d2, %d8 may complete in only 6 clock cycles when performed in accordance with present embodiments, as summarized below in Table 2.

TABLE 2

| command | clock cycle |
| --- | --- |
| load % f0 | 0 |
| load % f1 | 1 |
| load % f2 | 2 |
| load % f3 | 3 |
| merge % f0, f1 → % d0 | 4 |
| merge % f2, f3 → % d2 | 5 |
| fadd % d0, % d2, % d4 | 6 |

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention. For instance, although described above with respect to a single scalar architecture, present embodiments are equally applicable to super-scalar and SIMD architectures, where performance advantages over prior techniques are even greater than that described above.

I claim:

1. A method for improving performance when representing double precision operands with aliased single precision operands, the method comprising:

loading first and second single precision operands into first and second rows of a re-order buffer;

loading third and fourth single precision operands into third and fourth rows of the re-order buffer;

merging the first and second single precision operands into a fifth row of the re-order buffer to represent a first double precision operand;

merging the third and fourth single precision operands into a sixth row of the re-order buffer to represent a second double precision operand;

providing the first and second double precision operands from the re-order buffer directly to an associated execution unit; and performing a double precision operation using the first and second double precision operands to produce a double precision result.

2. The method of claim 1, wherein the re-order buffer is 64-bits wide, and the single precision operands comprise 32 bits and the double precision operands comprise 64 bits.

3. The method of claim 1, wherein the execution unit is a floating point execution unit.

4. The method of claim 1, wherein the operation comprises addition.

5. The method of claim 1, wherein the operation comprises subtraction.

6. The method of claim 1, wherein the operation comprises multiplication.

7. The method of claim 1, wherein the operation comprises division.

8. The method of claim 1, wherein the operation comprises alignment.

9. A method for improving performance when representing double precision operands with aliased single precision operands, the method comprising:

loading first and second single precision operands into first and second rows of a re-order buffer;

merging the first and second single precision operands into a third row of the re-order buffer to represent a first double precision operand;

loading third and fourth single precision operands into fourth and fifth rows of the re-order buffer;

merging the third and fourth single precision operands into a sixth row of the re-order buffer to represent a second double precision operand;

providing the first and second double precision operands from the re-order buffer directly to an associated execution unit; and performing a double precision operation using the first and second double precision operands to produce a double precision result.

10. The method of claim 9, wherein the re-order buffer is 64-bits wide, and the single precision operands comprise 32 bits and the double precision operands comprise 64 bits.

11. The method of claim 9, wherein the execution unit is a floating point execution unit.

12. The method of claim 9, wherein the operation comprises addition.

13. The method of claim 9, wherein the operation comprises subtraction.

14. The method of claim 9, wherein the operation comprises multiplication.

15. The method of claim 9, wherein the operation comprises division.

16. The method of claim 9, wherein the operation comprises alignment.

* * * * *